United States Patent
Nam et al.

(10) Patent No.: US 8,509,155 B2
(45) Date of Patent: Aug. 13, 2013

(54) METHOD AND SYSTEM FOR MULTIPLEXING ACKNOWLEDGEMENT SIGNALS AND SOUNDING REFERENCE SIGNALS

(75) Inventors: Young-Han Nam, Richardson, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 223 days.

(21) Appl. No.: 13/175,656

(22) Filed: Jul. 1, 2011

(65) Prior Publication Data

US 2012/0014320 A1 Jan. 19, 2012

Related U.S. Application Data

(60) Provisional application No. 61/365,272, filed on Jul. 16, 2010, provisional application No. 61/382,396, filed on Sep. 13, 2010.

(51) Int. Cl.
*H04W 4/00* (2009.01)

(52) U.S. Cl.
USPC .......................................... 370/328; 455/515

(58) Field of Classification Search
None
See application file for complete search history.

(56) References Cited

U.S. PATENT DOCUMENTS

| | | | | |
|---|---|---|---|---|
| 2011/0249578 | A1* | 10/2011 | Nayeb Nazar et al. | 370/252 |
| 2012/0069793 | A1* | 3/2012 | Chung et al. | 370/315 |
| 2012/0320813 | A1* | 12/2012 | Han et al. | 370/311 |
| 2013/0022019 | A1* | 1/2013 | Han et al. | 370/329 |

OTHER PUBLICATIONS

International Search Report dated Feb. 6, 2012 in connection with International Patent Application No. PCT/KR2011/005192.
"UL Sounding RS for E-UTRA", Motorola, 3GPP TSG RAN WG1 #50, Athens, Greece, Aug. 20-24, 2007, 8 pages.
"Cyclic shift and orthogonal cover allocations for UL ACK/NACK", Samsung, 3GPP TSG RAN WG1 Meeting #50bis, Athens, Greece, Aug. 20-24, 2007, 5 pages.
"Multiplexing of Sounding RS and PUCCH", Qualcomm Europe, 3GPP TSG RAN1 #49-bis, Jun. 25-29, 2007, Orlando, USA, 6 pages.

\* cited by examiner

*Primary Examiner* — Chi Pham
*Assistant Examiner* — Raul Rivas

(57) ABSTRACT

A base station includes a transmit path circuitry that determines a PUCCH format 3 index and transmits an uplink grant to a subscriber station, the uplink grant including an indication of the PUCCH format 3 index. The base station also includes a receive path circuitry that receives a PUCCH format 3 signal in a subframe from the subscriber station. The receive path circuitry also receives a first demodulation reference signal for the PUCCH format signal in the first slot of the subframe, where the first demodulation reference signal is determined based at least partly upon a first demodulation reference signal cyclic shift number. The receive path circuitry also receives a second demodulation reference signal for the PUCCH format 3 signal in the second slot of the subframe, where the second demodulation reference signal is determined based at least partly upon a second demodulation reference signal cyclic shift number.

24 Claims, 12 Drawing Sheets

| q | 0 | 1 | 2 | 3 | 4 |
|---|---|---|---|---|---|
| $w_5(q)$ | $w_5(0)$ | $w_5(1)$ | $w_5(2)$ | $w_5(3)$ | $w_5(4)$ |
| $w_4(q)$ | $w_4(0)$ | $w_4(1)$ | $w_4(2)$ | $w_4(3)$ | $w_4(4)=w_4(0)$ |

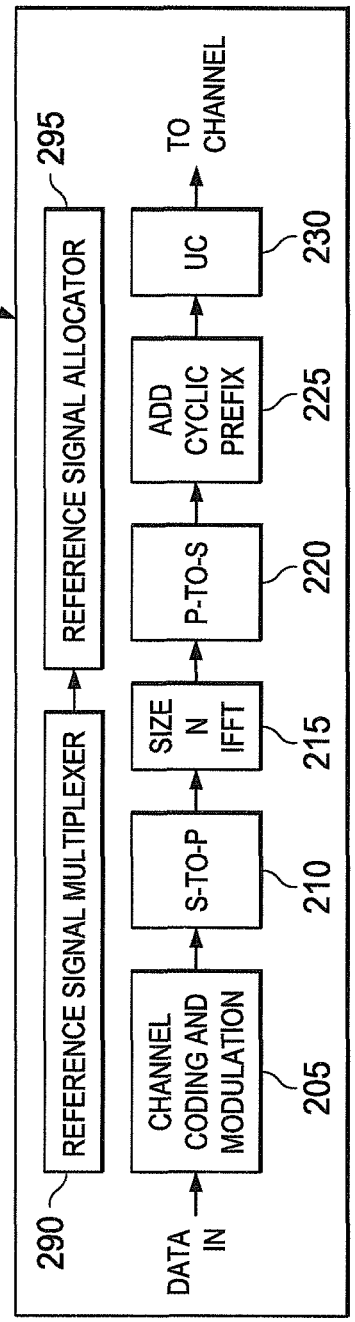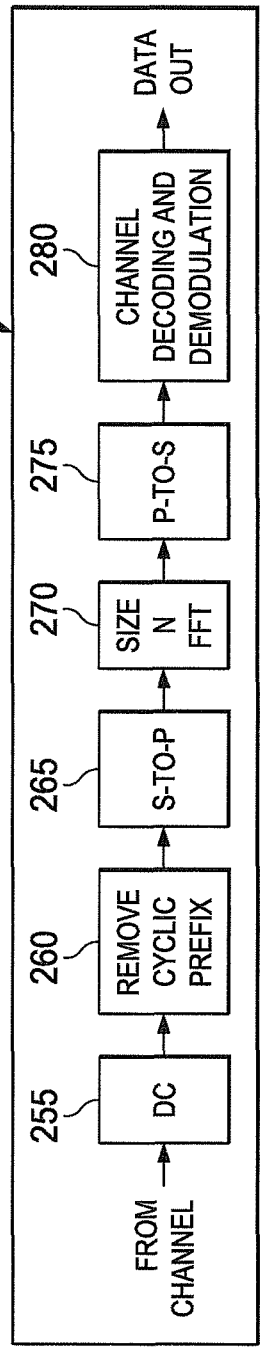

FIG. 6

(a) DETERMINATION OF OCC AND PRB NUMBERS OF A PUCCH FORMAT X TRANSMITTED IN A NORMAL SUBFRAME

(b) DETERMINATION OF OCC AND PRB NUMBERS OF A (SHORTENED) PUCCH FORMAT X TRANSMITTED IN AN SRS SUBFRAME ACCORDING TO EXAMPLE 1

(c) DETERMINATION OF OCC AND PRB NUMBERS OF A (SHORTENED) PUCCH FORMAT X TRANSMITTED IN AN SRS SUBFRAME ACCORDING TO EXAMPLE 2

(d) DETERMINATION OF OCC AND PRB NUMBERS OF A (SHORTENED) PUCCH FORMAT X TRANSMITTED IN AN SRS SUBFRAME ACCORDING TO EXAMPLE 3

FIG. 8A  810

| $n_{OC,1}$ (OR $n_{OC,0}$) | $n_{CS}^{(3)}$ |
|---|---|
| 0 | 0 |
| 1 | 2 |
| 2 | 4 |
| 3 | 6 |
| 4 | 8 |

FIG. 8B  820

| $n_{OC,1}$ (OR $n_{OC,0}$) | $n_{CS}^{(3)}$ |
|---|---|
| 0 | 0 |
| 1 | 6 |
| 2 | 3 |
| 3 | 8 |
| 4 | 10 |

| $n_{OC,1}$ (OR $n_{OC,0}$) | $n_{CS}^{(3)}$ |
|---|---|
| 0 | 0 |
| 1 | 6 |
| 2 | 3 |
| 3 | $9-(N_{SF}-4)$ |
| 4 | 10 |

920

| $n_{OC,1}$ (OR $n_{OC,0}$) | $n_{CS}^{(3)}$ |
|---|---|
| 0 | 0 |
| 1 | 6 |
| 2 | 3 |
| 3 | 9 |
| 4 | - |

930

| $n_{OC,1}$ (OR $n_{OC,0}$) | $n_{CS}^{(3)}$ |
|---|---|
| 0 | 0 |
| 1 | 6 |
| 2 | 3 |
| 3 | 8 |
| 4 | 10 |

| $n_{OC,1}$ (OR $n_{OC,0}$) | $n_{CS,0}^{(3)}=n_{CS,1}^{(3)}$ | $n_{DMRSOC,0}^{(3)}$ | $n_{DMRSOC,1}^{(3)}$ |
|---|---|---|---|
| 0 | 0 | [1 1] | [1 -1] |
| 1 | 6 | [1 1] | [1 -1] |
| 2 | 3 | [1 1] | [1 -1] |
| 3 | 8 | [1 1] | [1 -1] |
| 4 | 10 | [1 1] | [1 -1] |

| $n_{OC,1}$ (OR $n_{OC,0}$) | $n_{CS,0}^{(3)}=n_{CS,1}^{(3)}$ | $n_{DMRSOC,0}^{(3)}$ | $n_{DMRSOC,1}^{(3)}$ |
|---|---|---|---|
| 0 | 0 | [1 1] | [1 -1] |
| 1 | 2 | [1 -1] | [1 1] |
| 2 | 4 | [1 1] | [1 -1] |
| 3 | 6 | [1 -1] | [1 1] |
| 4 | 8 | [1 1] | [1 -1] |

| $n_{OC,1}$ (OR $n_{OC,0}$) | $n_{CS,0}^{(3)}$ | $n_{DMRSOC,0}^{(3)}$ | $n_{CS,1}^{(3)}$ | $n_{DMRSOC,1}^{(3)}$ |
|---|---|---|---|---|
| 0 | 0 | [1 1] | 6 | [1 -1] |
| 1 | 2 | [1 -1] | 8 | [1 1] |
| 2 | 4 | [1 1] | 10 | [1 -1] |
| 3 | 8 | [1 -1] | 2 | [1 1] |
| 4 | 10 | [1 1] | 4 | [1 -1] |

| $n_{OC,1}$ (OR $n_{OC,0}$) | $n_{CS,0}^{(3)}$ | $n_{DMRSOC,0}^{(3)}$ | $n_{CS,1}^{(3)}$ | $n_{DMRSOC,1}^{(3)}$ |
|---|---|---|---|---|
| 0 | 0 | [1 1] | 7 | [1 -1] |
| 1 | 3 | [1 -1] | 8 | [1 1] |
| 2 | 4 | [1 1] | 11 | [1 -1] |
| 3 | 9 | [1 -1] | 2 | [1 1] |
| 4 | 10 | [1 1] | 5 | [1 -1] |

US 8,509,155 B2

METHOD AND SYSTEM FOR MULTIPLEXING ACKNOWLEDGEMENT SIGNALS AND SOUNDING REFERENCE SIGNALS

CROSS-REFERENCE TO RELATED APPLICATION(S) AND CLAIM OF PRIORITY

The present application is related to U.S. Provisional Patent Application No. 61/365,272, filed Jul. 16, 2010, entitled "METHODS AND APPARATUS OF MULTIPLEXING ACKNOWLEDGEMENT SIGNALS AND SOUNDING REFERENCE SIGNALS", and U.S. Provisional Patent Application No. 61/382,396, filed Sep. 13, 2010, entitled "RESOURCE CHANNELIZATION FOR SC-FDMA TRANSMISSIONS". Provisional Patent Application Nos. 61/365,272 and 61/382,396 are assigned to the assignee of the present application and are hereby incorporated by reference into the present application as if fully set forth herein. The present application hereby claims priority under 35 U.S.C. §119(e) to U.S. Provisional Patent Application Nos. 61/365,272 and 61/382,396.

TECHNICAL FIELD OF THE INVENTION

The present application relates generally to wireless communications and, more specifically, to a method and system for multiplexing acknowledgement signals and sounding reference signals.

BACKGROUND OF THE INVENTION

In 3$^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station comprises a transmit path circuitry configured to determine a PUCCH format 3 $n_{PUCCH}^{(3)}$ index and transmit an uplink grant to a subscriber station, the uplink grant having an indication of the PUCCH format $n_{PUCCH}^{(3)}$ index. The base station also includes a receive path circuitry configured to receive a PUCCH format 3 signal in a subframe from the subscriber station. The receive path circuitry is also configured to receive a first demodulation reference signal for the PUCCH format 3 signal in the first slot of the subframe, the first demodulation reference signal determined based at least partly upon a first demodulation reference signal cyclic shift (DM RS CS) number $n_{CS,0}$. The receive path circuitry is further configured to receive a second demodulation reference signal for the PUCCH format 3 signal in the second slot of the subframe, the second demodulation reference signal determined based at least partly upon a second DM RS CS number $n_{CS,1}$. The first DM RS CS number $n_{CS,0}$ is determined based on a first orthogonal cover code (OCC) number $n_{OC,0}$ and a first spreading factor number $N_{SF,0}$ for the first slot, and the second DM RS CS number $n_{CS,1}$ is determined based on a second OCC number $n_{OC,1}$ and a second spreading factor number $N_{SF,1}$ for the second slot. The first OCC number $n_{OC,0}$ is derived at least partly upon the PUCCH format 3 $n_{PUCCH}^{(3)}$ PUCCH index and the second OCC number $n_{OC,1}$ is derived at least partly upon the first OCC number $n_{OC,0}$ and the second spreading factor number $N_{SF,1}$. The first spreading factor number $N_{SF,0}$ is equal to a number of available non-RS SC-FDM symbols of the PUCCH format 3 signal in the first time slot and the second spreading factor number $N_{SF,1}$ is equal to a number of available non-RS SC-FDM symbols of the PUCCH format 3 signal in the second time slot.

A method of operating a base station is provided. The method includes determining a PUCCH format 3 $n_{PUCCH}^{(3)}$ index. The method also includes transmitting an uplink grant to a subscriber station, the uplink grant comprising an indication of the PUCCH format 3 $n_{PUCCH}^{(3)}$ index. The method further includes receiving a PUCCH format 3 signal in a subframe from the subscriber station. The method still further includes receiving a first demodulation reference signal for the PUCCH format 3 signal in the first slot of the subframe, the first demodulation reference signal determined based at least partly upon a first demodulation reference signal cyclic shift (DM RS CS) number $n_{CS,0}$. The method also includes receiving a second demodulation reference signal for the PUCCH format 3 signal in the second slot of the subframe, the second demodulation reference signal determined based at least partly upon a second DM RS CS number $n_{CS,1}$. The first DM RS CS number $n_{CS,0}$ is determined based on a first orthogonal cover code (OCC) number $n_{OC,0}$ and a first spreading factor number $N_{SF,0}$ for the first slot, and the second DM RS CS number $n_{CS,1}$ is determined based on a second OCC number $n_{OC,1}$ and a second spreading factor $N_{SF,1}$ for the second slot. The first OCC number $n_{OC,0}$ is derived at least partly upon the PUCCH format 3 $n_{PUCCH}^{(3)}$ index and the second OCC number $n_{OC,1}$ is derived at least partly upon the first OCC number $n_{OC,0}$ and the second spreading factor number $N_{SF,1}$. The first spreading factor number $N_{SF,0}$ is equal to a number of available non-RS SC-FDM symbols of the PUCCH format 3 signal in the first time slot and the second spreading factor number $N_{SF,1}$ is equal to a number of available non-RS SC-FDM symbols of the PUCCH format 3 signal in the second time slot.

A subscriber station is provided. The subscriber station includes a receive path circuitry configured to receive, from a base station, an uplink grant comprising an indication of a PUCCH format 3 $n_{PUCCH}^{(3)}$ index. The subscriber station also includes a transmit path circuitry configured to derive a first spreading factor number $N_{SF,0}$ to be equal to a number of available non-RS SC-FDM symbols of a PUCCH format 3 signal in the first slot of a subframe and a second spreading factor number $N_{SF,1}$ to be equal to a number of available non-RS SC-FDM symbols of a PUCCH format 3 signal in the second slot of the subframe. The transmit path circuitry is also configured to derive a first orthogonal cover code number (OCC) number $n_{OC,0}$ based at least partly upon the PUCCH format 3 $n_{PUCCH}^{(3)}$ index, and a second OCC number $n_{OC,1}$ based at least partly upon the first OCC number $n_{OC,0}$ and the second spreading factor number $N_{SF,1}$. The transmit path circuitry is further configured to determine a first demodulation reference signal cyclic shift (DM RS CS) number $n_{CS,0}$ for the first slot based on the first OCC number $n_{OC,0}$ and the first spreading factor number $N_{SF,0}$, and determine a second DM RS CS number $n_{CS,1}$ for the second slot based on the second OCC number $n_{OC,1}$ and the second spreading factor number $N_{SF,1}$. The transmit path circuitry is still further configured to generate a first demodulation reference signal for the PUCCH format 3 signal in the first slot of the subframe based at least partly upon the first DM RS CS number $n_{CS,0}$, and generate a second demodulation reference signal for the PUCCH format 3 signal in the second slot of the subframe based at least partly upon the second DM RS CS number $n_{CS,1}$. The transmit path circuitry is also configured to transmit the demodulation reference signals and the PUCCH format 3 signal to the base station.

A method of operating a subscriber station is provided. The method includes receiving, from a base station, an uplink grant comprising an indication of a PUCCH format 3 $n_{PUCCH}^{(3)}$ index. The method also includes deriving a first spreading factor number $N_{SF,0}$ to be equal to a number of available non-RS SC-FDM symbols of a PUCCH format 3 signal in the first slot of a subframe and a second spreading factor number $N_{SF,1}$ to be equal to a number of available non-RS SC-FDM symbols of a PUCCH format 3 signal in the second slot of the subframe. The method further includes deriving a first orthogonal cover code number (OCC) number $n_{OC,0}$ based at least partly upon the PUCCH format 3 $n_{PUCCH}^{(3)}$ and a second OCC number $n_{OC,1}$ based at least partly upon the first OCC number $n_{OC,0}$ and the second spreading factor number $N_{SF,1}$. The method still further includes determining a first demodulation reference signal cyclic shift (DM RS CS) number $n_{CS,0}$ for the first slot based on the first OCC number $n_{OC,0}$ and the first spreading factor number $N_{SF,0}$, and determining a second DM RS CS number $n_{CS,1}$ for the second slot based on the second OCC number $n_{OC,1}$ and the second spreading factor number $N_{SF,1}$. The method also includes generating a first demodulation reference signal for the PUCCH format 3 signal in the first slot of the subframe based at least partly upon the first DM RS CS number $n_{CS,0}$, and generating a second demodulation reference signal for the PUCCH format 3 signal in the second slot of the subframe based at least partly upon the second DM RS CS number $n_{CS,1}$. The method further includes transmitting the demodulation reference signals and the PUCCH format 3 signal to the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a high-level diagram of an OFDMA transmitter according to one embodiment of the disclosure;

FIG. 3 is a high-level diagram of an OFDMA receiver according to one embodiment of the disclosure;

FIG. 6 illustrates methods of determining an orthogonal cover code (OCC) number and a physical resource block (PRE) number according to embodiments of this disclosure

FIGS. 8A and 8B are tables depicting demodulation reference signal cyclic shift (DM RS CS) mappings according to embodiments of this disclosure;

FIG. 9 shows tables depicting demodulation reference signal cyclic shift (DM RS CS) mappings according to other embodiments of this disclosure;

FIGS. 10A and 10B are tables depicting demodulation reference signal cyclic shift (DM RS CS) and orthogonal cover (OC) mappings according to embodiments of this disclosure;

FIGS. 11A and 11B are tables depicting demodulation reference signal cyclic shift (DM RS CS) and orthogonal cover (OC) mappings according to other embodiments of this disclosure;

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figures 1, 5:
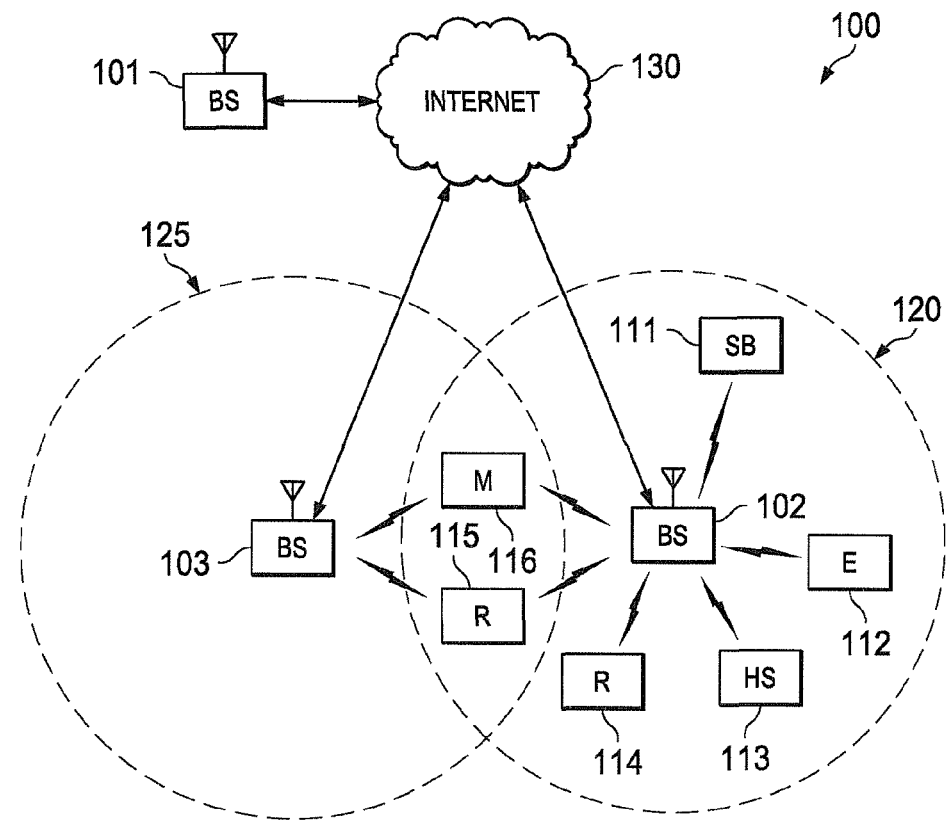
FIG. 1 illustrates an exemplary wireless network that transmits messages in the uplink according to the principles of the present disclosure.
FIG. 5 illustrates a table mapping $w_4(q)$ as a function of either $w_5(q)$ or q.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown)

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of an Orthogonal Frequency Division Multiple Access (OFDMA) transmit path 200. FIG. 3 is a high-level diagram of an OFDMA receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size PI IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using Code Division Multiplexing (CDM) or Time/Frequency Division Multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at ES 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

The transmitted signal in each downlink (DL) slot of a resource block is described by a resource grid of $N_{RF}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, tree index p may be dropped.

In LTE, DL reference signals (RSs) are used for two purposes. First, UEs measure Channel Quality Information (CQI), Rank Information (RI) and Precoder Matrix Information (PMI) using DL RSs. Second, each UE demodulates the DL transmission signal intended for itself using the DL RSs. In addition, DL RSs are divided into three categories: cell-specific RSs, Multi-media Broadcast over a Single Frequency Network (MBSFN) RSs, and UE-specific RSs or dedicated RSs (DRSs).

Cell-specific reference signals (or common reference signals: CRSS) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission of Physical Downlink Shared CHannel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

In R1-102612, "Evaluation Of PUCCH Proposals For Carrier Aggregation," Ericsson, ST-Ericsson, May 2010, which is hereby incorporated by reference into the present application as if fully set forth herein, a new PUCCH (Physical Uplink Control CHannel) based on a discrete Fourier transform-spread orthogonal frequency division multiplexing (DFT-S-OFDM) is proposed (hereinafter referred to as "PUCCH format X").

In PUCCH format X, an input to a channel encoding block is information bit stream, which can be, for example, HARQ-ACK (hybrid automatic repeat request-acknowledgement signaling) bits, or channel quality information (CQI) bits. The output of the channel coding block is a coded bit stream.

A cell-specific scrambling block scrambles each bit of the coded bit stream, and a modulation block receives an input of a scrambled bit stream and generates an output of 2 sets of 12 modulation symbols.

Each set of 12 modulation symbols is spread 5 times, with a spreading code (or an orthogonal cover code, OCC) $[w_0 w_1 w_2 w_3 w_4]$, where the spreading code is conveyed in an RRC signaling. In other words, denoting a set of 12 modulation symbols as $\{s_0 s_1 \ldots s_{11}\}$, after spreading, there are five spread sets, $\{w_0 s_0 w_0 s_1 \ldots w_0 s_{11}\}$, $\{w_1 s_0 w_1 s_1 \ldots w_1 s_{11}\}, \ldots \{w_4 s_0 w_4 s_1 \ldots w_4 s_{11}\}$. The 12 modulation symbols in each spread set is discrete Fourier transformed (DFT'ed), and then inverse Fourier transformed (IFFT'ed). The resultant time-domain signal is placed in a single-carrier frequency-division multiplexing (SC-FDM) symbol duration. The 5 spread sets are located within a same time slot.

In one example, the length-5 OCC is a length-5 DFT-sequence, i.e., $$w_5(q) = \left[ 1 \; e^{j\frac{2\pi q}{5}} \; e^{2j\frac{2\pi q}{5}} \; e^{3j\frac{2\pi q}{5}} \; e^{4j\frac{2\pi q}{5}} \right],$$

where q is one of 0, 1, 2, 3 and 4.

For demodulation, two reference signal (RS) SC-FDM symbols are provided in each time slot. RS signals are generated according to 3GPP Technical Specification No. 36.211, version 9.1.0, "E-UTRA, Physical Channels And Modulation", March 2010, which is hereby incorporated by reference into the present application as if fully set forth herein, where RS signal sequences are CAZAC (constant-amplitude zero-autocorrelation) sequences. An example of CAZAC sequence is Zadoff-Chu (ZC) sequence.

In 3GPP LTE, sounding reference signal (SRS) resources, i.e., SRS bandwidth and SRS subframes, are cell-specifically configured. In addition, for each UE, a subset of SRS resources are assigned by radio resource control (RRC) configuration. In some RRC configuration, a UE is configured to transmit SRS periodically in subframes in different resource blocks (RBs). In other configurations, a UE's HARQ-ACK transmission is dynamically triggered by a reception of the physical downlink shared channel (PDSCH). When a UE receives a PDSCH in subframe n, the UE is supposed to transmit HARQ-ACK in subframe n+k, where k is a positive integer (e.g., in FDD, k=4). As transmission of HARQ-ACK by a UE is independently triggered of SRS transmission, a UE needs to have a clearly defined behavior when both HARQ-ACK and SRS are triggered in the same subframe.

When HARQ-ACK is scheduled to be transmitted on PUCCH format X in a cell-specific SRS subframe, a UE would either (1) drop the SRS and transmit only HARQ-ACK on PUCCH format X, or (2) transmit a shortened PUCCH format X, and transmit SRS on the last SC-FDM symbol in the second slot of the subframe if SRS is scheduled.

Figure 4:
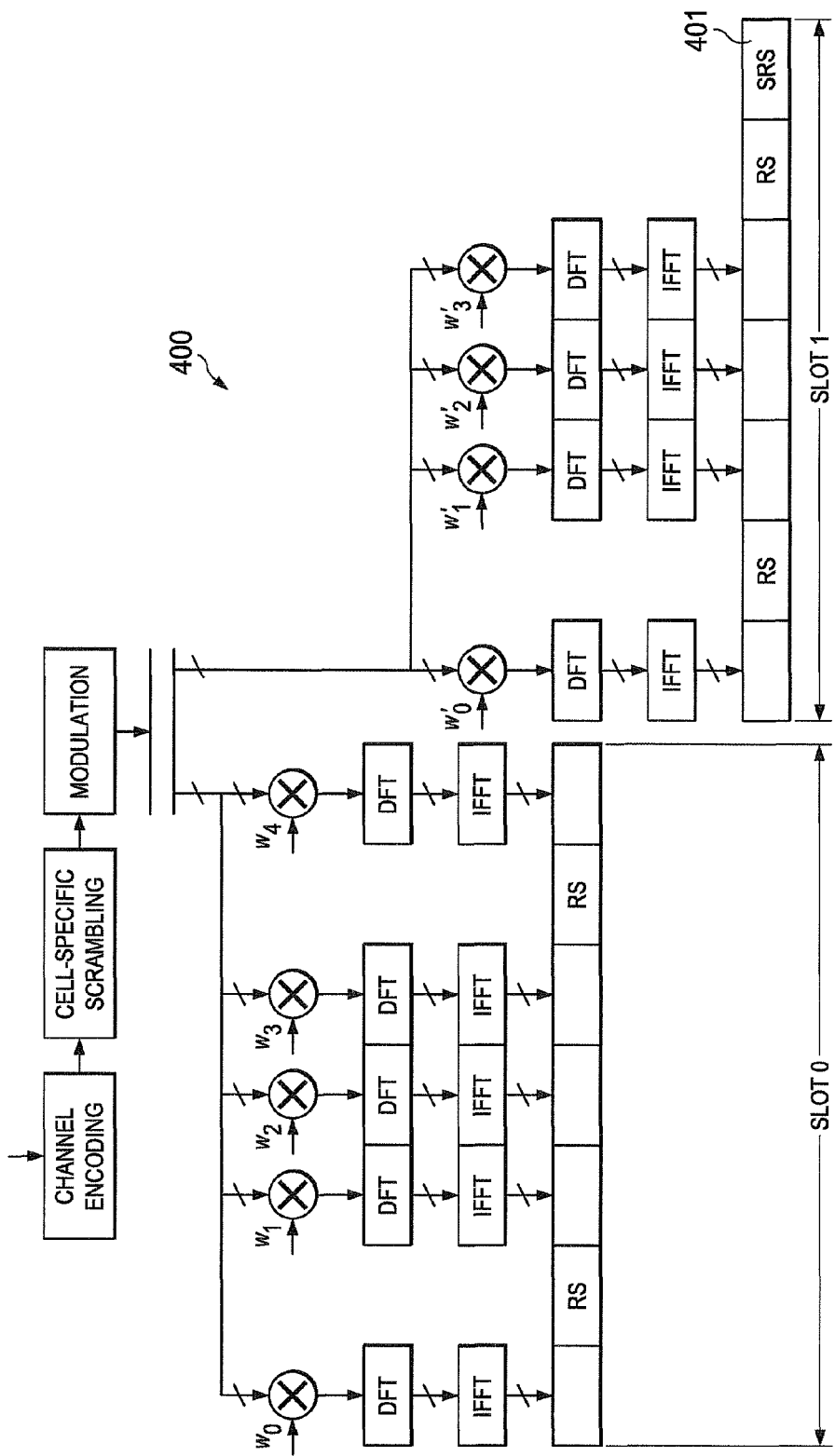
FIG. 4 illustrates a shortened PUCCH format according to an embodiment of this disclosure.

FIG. 4 illustrates a shortened PUCCH format 400 according to an embodiment of this disclosure.

As shown in FIG. 4, the shortened PUCCH format 400 is constructed by removing the last SC-FDM symbol 401 in the second slot in the SRS subframe. In the second slot, only 4 SC-FDM symbols are used for conveying the HARQ-ACK.

In some embodiments, if a UE is configured to use an OCC $w_5(q)$, then the UE would use $w_5(q)$ in the first slot of the shortened PUCCH format 400. The UE would use a length-4 OCC $w_4(q)=[w'_0 w'_1 w'_2 w'_3]$ in the second slot of the shortened PUCCH format 400, where $w_4(q)$ is determined as a function of either $w_5(q)$ or q.

FIG. 5 illustrates a table 500 mapping $w_4(q)$ as a function of either $w_5(q)$ or q.

One example of determining $w_4(q)$ from $w_5(q)$ or q is shown in table 500, where $$w_5(q) = \left[ 1 \; e^{j\frac{2\pi q}{5}} \; e^{2j\frac{2\pi q}{5}} \; e^{3j\frac{2\pi q}{5}} \; e^{4j\frac{2\pi q}{5}} \right],$$

for q=0, 1, 2, 3, 4 and $w_4(q)$ is a length-4 Hadamard sequences, i.e., $w_4(0)=[1\;1\;1\;1]$, $w_4(1)=[1\;-1\;1\;-1]$, $w_4(2)=[1\;-1\;-1\;1]$, $w_4(3)=[1\;1\;-1\;-1]$.

In other words, when a UE is configured to use an OCC q in the first slot of a subframe, the UE would use an OCC q mod 4 in the second slot of the subframe where the shortened PUCCH format 400 is used.

When the mapping of $w_4(q)$ from $w_5(q)$ or q is done as shown in table 500, an eNodeB should take special care when the eNodeB assigns the fifth OCC $w_5(4)$ to a UE, so that the UE does not transmit HARQ-ACK in an SRS subframe when another UE configured with $w_5(0)$ transmits HARQ-ACK in the same SRS subframe.

In some embodiments of this disclosure, a UE is signaled (3) to use a PUCCH format X resource in a subframe, denoted by $n_{PUCCH}^{(3)}$. In addition, the UE determines two spreading factors (SFs, or the lengths of OCCs) $N_{SF,0}$ and $N_{SF,1}$ by counting the number of available non-RS SC-FDM symbols in the subframe. $N_{SF,0}$ is the SF used for the first slot, and $N_{SF,1}$ is the SF used for the second slot of the subframe. When the PUCCH format X is used for the subframe, $N_{SF,0} = N_{SF,1} = 5$. On the other hand, when the shortened PUCCH format 400 is used for the subframe, $N_{SF,0} = 5$ and $N_{SF,1} = 4$.

Then, PRB number $n_{PRB}$ where the PUCCH format X resource is located in the frequency domain, and OCC numbers $n_{OC,0}$ and $n_{OC,1}$ to be used in the first and the second slots of the PRB $n_{PRB}$ by the UE in the subframe, are determined as functions of at least one of PUCCH format X resource number $n_{PUCCH}^{(3)}$ and two SFs, $N_{SF,0}$ and $N_{SF,1}$. In other words, $n_{PRB} = f_1(n_{PUCCH}^{(3)}, N_{SF,0}, N_{SF,1})$, $n_{OC,0} = f_2(n_{PUCCH}^{(3)}, N_{SF,0}, N_{SF,0}, N_{SF,1})$ and $n_{OC,1} = f_3(n_{PUCCH}^{(3)}, N_{SF,0}, N_{SF,1})$. Given spreading factors $N_{SF,0}$ and $N_{SF,1}$, $n_{OC,0} \in \{0, 1, \ldots, N_{SF,0}\}$ and $n_{OC,1} \in \{0, 1, \ldots, N_{SF,1}\}$.

Some example sets of functions $f_1, f_2, f_3$ are listed below:

Example 1

$n_{PRB} = \text{floor}(n_{PUCCH}^{(3)}/N_{SF,1}) + N_{PUCCH}^{(3)}$.

$n_{OC,0} = n_{OC,1} = n_{PUCCH}^{(3)} \bmod N_{SF,1}$.

Example 2

$n_{PRB} = \text{floor}(n_{PUCCH}^{(3)}/N_{SF,0}) + N_{PUCCH}^{(3)}$.

$n_{OC,0} = n_{PUCCH}^{(3)} \bmod N_{SF,0}$.

$n_{OC,1} = n_{OC,0} \bmod N_{SF,1}$.

Example 3

$n_{PRB} = \text{floor}(n_{PUCCH}^{(3)}/N_{SF,0}) + N_{PUCCH}^{(3)}$.

$n_{OC,1} = n_{OC,0} = (n_{PUCCH}^{(3)} \bmod N_{SF,0}) \bmod N_{SF,1}$.

In the two examples above, $N_{PUCCH}^{(3)}$ is a resource offset, which is either a higher-layer signaled number, or a constant number, e.g., $N_{PUCCH}^{(3)} = 0$.

FIG. 6 illustrates methods of determining an orthogonal cover code (OCC) number and a physical resource block (PRB) number according to embodiments of this disclosure.

In FIG. 6, it is assumed that eNodeB uses 10 PUCCH format X resources numbered by $n_{PUCCH}^{(3)} = 0, 1, \ldots, 9$ in each subframe and the $N_{PUCCH}^{(3)}$ is a higher-layer signaled number. As shown at 601, when the PUCCH resource number is 8, the PRE number is $N_{PUCCH}^{(3)} + 1$ and the OCC number is 3. In example 1 at 603, when the PUCCH resource number is 8, the PRB number is $N_{PUCCH}^{(3)} + 2$ and the OCC number is 1. In example 2 at 605, when the PUCCH resource number is 8, the PRB number is $N_{PUCCH}^{(3)} + 1$ and the OCC number is $n_{OC,0} = n_{OC,1} = 3$. In example 3 at 607, when the PUCCH resource number is 8, the PRB number is $N_{PUCCH}^{(3)} + 1$ and the OCC number is $n_{OC,0} = n_{OC,1} = 3$.

As shown in FIG. 6, the number of PRBs being used by PUCCH format 3 in an SRS subframe is kept the same when example 2 or example 3 is used as indicated at 605 and 607, respectively. The number of PRBs increases in an SRS subframe when example 1 is used as indicated at 603.

Figure 7A:
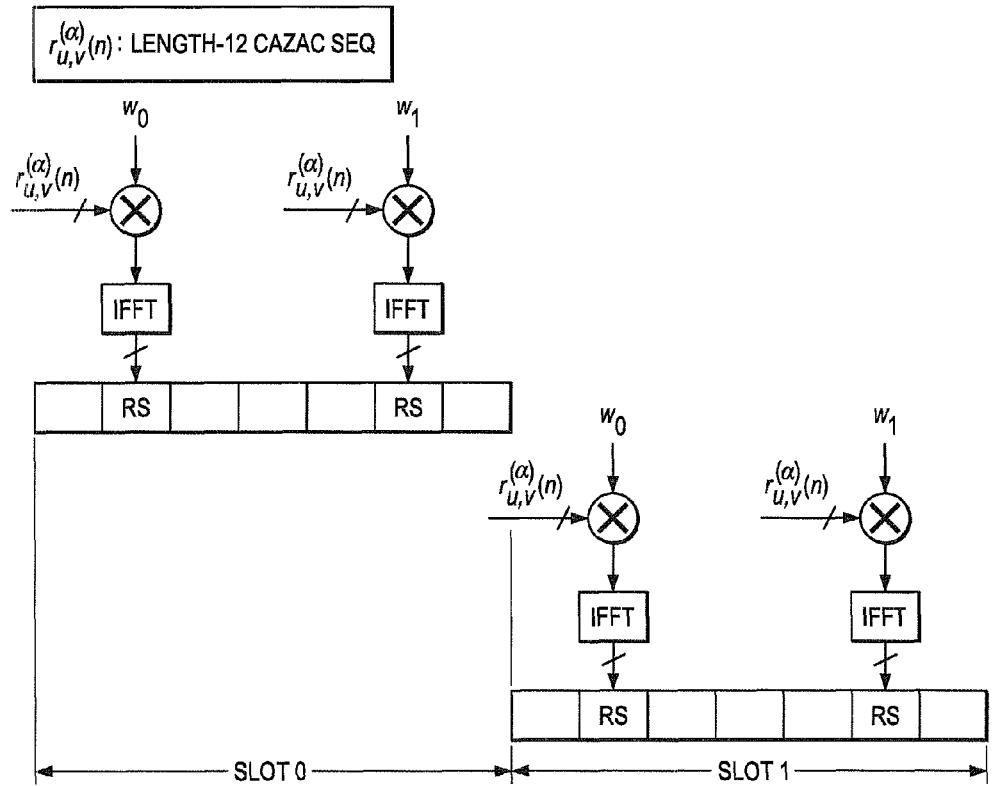
FIGS. 7A and 7B illustrate the application of an orthogonal cover code across two demodulation reference signal single-carrier frequency-division multiplexing (DM RS SC-FDM) symbols according to embodiments of this disclosure.
Figure 7B:
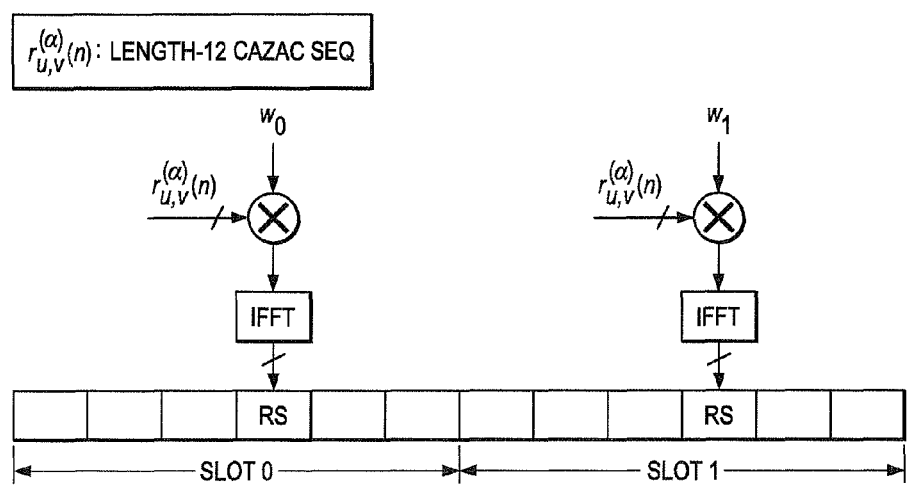

FIGS. 7A and 7B illustrate the application of an orthogonal cover code across two demodulation reference signal single-carrier frequency-division multiplexing (DM RS SC-FDM) symbols according to embodiments of this disclosure.

In embodiments of this disclosure, multiple DM RS for multiple PUCCH format X's to be transmitted in the same pair of PRBs are multiplexed using the cyclic shift (CS) separation and time-domain orthogonal cover (OC) separation. FIGS. 7A and 7B illustrate two examples of applying time-domain OCC according to embodiments of this disclosure. In FIG. 7A, OCC is applied across two DM RS SC-FDM symbols in each time slot. In FIG. 7B, OCC is applied across two DM RS SC-FDM symbols across two time slots in a subframe. In FIGS. 7A and 7B, [w0 w1] is either [1 1] or [1 −1], for example.

Note that the OCC mapping method shown in FIG. 7B is a valid approach only when frequency hopping is disabled. If frequency hopping is enabled, then the two channels experienced in the two DM RS SC-FDM symbols are different. Hence, a receiver cannot estimate two independent channels out of two received signals, each of which is a superimposed signal of two channel signals.

For example, in a normal-CP subframe, OCC is applied in the two DM RS SC-FDM symbols in each time slot as shown in FIG. 7A. In an extended-CP subframe, OCC is applied in the two DM RS SC-FDM symbols across two time slots in a subframe as shown in FIG. 7B.

In FIGS. 7A and 7B, the demodulation reference signal $r_{u,v}^{(\alpha)}(n)$ is determined according to the following:

$$r_{u,v}^{(\alpha)}(n) = e^{j\alpha n} \bar{r}_{u,v}(n), \ 0 \leq n < M_{sc}^{RS}.$$

Here $\bar{r}_{u,v}(n)$ is a reference signal base sequence and $M_{sc}^{RS}$ is a number of assigned subcarriers for the demodulation reference signal.

The cyclic shift $\alpha(n_s, l)$ is determined according to the following:

$$\alpha(n_s, l) = 2\pi \cdot n_{cs}(n_s, l) / N_{sc}^{RB},$$

where $$n_{cs}(n_s, l) = (n_{cs}^{cell}(n_s, l) + n_{CS}^{(3)}(n_s)) \bmod N_{SC}^{RB}.$$

Here, $N_{SC}^{RB}$ is the total number of subcarriers in the physical resource block, $n_s$, is the slot number, l is the SC-FDM symbol number, and $n_{cs}^{cell}(n_s, l)$ is a cell-specific pseudo-random sequence.

For example, $n_{CS}^{(3)}(n_s)$ can be found as in the following.
For $n_s \bmod 2 = 0$, $n_{CS}^{(3)}(n_s)$ is derived from $n_{PUCCH}^{(3)}$.
For $n_s \bmod 2 = 1$ $$n_{CS}^{(3)}(n_2) = \lfloor N_{CS}^{RB}(n_{CS}^{(3)}(n_s-1)+1) \rfloor \bmod (N_{CS}^{RB}+1) - 1.$$

In one example, $N_{CS}^{RB}$ is $N_{SF,1}$.
In another example, $N_{CS}^{RB}$ is $N_{SF,2}$.
Embodiments of this disclosure provide a few different ways to derive $n_{CS}^{(3)}(n_s)$ from $n_{PUCCH}^{(3)}$.

In embodiments of this disclosure, the DM RS resources used for a PUCCH format X, i.e., cyclic shift (CS) and time-domain orthogonal cover (OC), are determined as a function of at least one of PUCCH format 3 resource number $n_{PUCCH}^{(3)}$, OCC numbers $n_{OC,0}$ and $n_{OC,1}$, and spreading factors $N_{SF,1}$ and $N_{SF,2}$ of the PUCCH format X. Here, $n_{OC,0} \in \{0, 1, \ldots, N_{SF,0}\}$ and $n_{OC,1} \in \{0, 1, \ldots N_{SF,1}\}$.

FIGS. 8A and 8B are tables depicting demodulation reference signal cyclic shift (DM RS CS) mappings according to embodiments of this disclosure.

In some embodiments of this disclosure, the DM RS CS number) $n_{CS}^{(3)}$ is determined as a function of either $n_{OC,0}$ or $n_{OC,1}$. Table 810 in FIG. 8A depicts a relation between $n_{CS}^{(3)}$ and $n_{OC,1}$, where the relationship is $n_{CS}^{(3)} = 2 \cdot n_{OC,1}$. Such an embodiment ensures that the difference between any two numbers of the five $n_{CS}^{(3)}$ numbers is no smaller than 2.

In some embodiments of this disclosure, the DM RS CS number $n_{CS}^{(3)}$ is determined as a function of either $n_{OC,0}$ or $n_{OC,1}$. Table 820 in FIG. 8B depicts a relation between $n_{CS}^{(3)}$ and $n_{OC,1}$.

In the example shown in the table 820, three entries of $n_{CS}^{(3)}$ i.e., 0, 6, and 3, are numbers equally dividing a set of 12 consecutive numbers $\{0, 1, 2, \ldots, 11\}$ into 4 groups of 3 numbers. The other two numbers, i.e., 8 and 10 are chosen so that the difference between any two numbers of the five $n_{CS}^{(3)}$ numbers is no smaller than 2.

FIG. 9 shows tables depicting demodulation reference signal cyclic shift (DM RS CS) mappings according to other embodiments of this disclosure.

In some embodiments, the DM RS CS number $n_{CS}^{(3)}$ is determined as a function of either $n_{OC,0}$ or $n_{OC,1}$ and $N_{SF,1}$. Table 910 depicts a relation between $n_{CS}^{(3)}$ and $n_{OC,1}$.

As shown in table 920, when $N_{SF,1}=4$, the CS separation is maximal. When $n_{OC,1}=3$, $9-(N_{SF,1}-4)$. Note that $n_{OC,1}=4$ is not used when $N_{SF,1}=4$. As shown in table 930, when $N_{SF,1}=5$, the CS separation is no larger than 2. When $n_{OC,1}=3$, $9-(N_{SF,1}-4)=8$ In some embodiments, a UE configured to transmit PUCCH format X using a 2-Tx diversity scheme (e.g., SORTD) uses one DM RS CS $n_{CS}^{(3)}$ and two DM RS OCCs [1 1] and [1 −1] for transmission of DM RS for the two antenna port On the other hand, a UE configured to transmit PUCCH format X using a single-antenna scheme uses one DM RS CS $n_{CS}^{(3)}$ and one DM RS OCC from [1 1] and [1 −1] for the transmission of DM RS for the one antenna port.

FIGS. 10A and 10B are tables depicting demodulation reference signal cyclic shift (DM RS CS) and orthogonal cover (OC) mappings according to embodiments of this disclosure.

In some embodiments, a first antenna's DM RS resource is determined by DM RS CS $n_{CS}^{(3)}$ and DM RS OCC [1 1] while a second antenna's DM RS resource is determined by DM RS CS $n_{CS}^{(3)}$ and DM RS OCC [1 −1]. Furthermore, $n_{CS}^{(3)}$ is obtained using table 820 from an OCC number $n_{OC,2}$. The DM RS CSs $n_{CS,0}^{(3)}$ and $n_{CS,1}^{(3)}$ and DM RS OCCs $n_{DMRSOC,0}^{(3)}$ and $n_{DMRSOC,1}^{(3)}$, for antenna ports 0 and 1, respectively, are obtained according to table 1010 of FIG. 10A.

In some embodiments, if the difference between a first and a second DM RS CSs is the same as the minimum difference of any two DM RS CSs, then a first DM RS OCC used together with the first DM RS CS is different from a second DM RS OCC used together with the second DM RS CS. Furthermore, $n_{CS}^{(3)}$ is obtained using table 810 from an OCC number $n_{OC,2}$. The DM RS CSs $n_{CS,0}^{(3)}$ and $n_{CS,1}^{(3)}$, and DM RS OCCs $n_{DMRSOC,0}^{(3)}$ and $n_{DMRSOC,1}^{(3)}$, for antenna ports 0 and 1, respectively, are obtained according to table 1020 of FIG. 10B. In table 1020, the DM RS OCC used for antenna port 0 is always different from the) DM RS OCC used for antenna port 1 for a given CS $n_{CS}^{(3)}$.

FIGS. 11A and 11B are tables depicting demodulation reference signal cyclic shift (DM RS CS) and orthogonal cover (OC) mappings according to other embodiments of this disclosure.

In some embodiments, a UE configured to transmit PUCCH format X using a 2-Tx diversity scheme (e.g., SORTD) uses two DM RS CS $n_{CS,0}^{(3)}$ and $n_{CS,1}^{(3)}$, and two DM RS OCCs [1 1] and [1 −1] for the transmission of DM RS for the two antenna ports. On the other hand, a UE configured to transmit PUCCH format X using a single-antenna scheme uses one DM RS CS $n_{CS}^{(3)}$ and one DM RS OCC from [1 1] and [1 −1] for the transmission of DM RS for the one antenna port.)

In one example, the first DM RS CS $n_{CS,0}^{(3)}$ to be used by antenna port 0 is derived as a function of $n_{OC,2}$, and the second DM RS CS $n_{CS,1}^{(3)}$ to be used by antenna port 1 is derived by $n_{CS,1}^{(3)} = (n_{CS,0}^{(3)} + 6) \mod 12$. The corresponding DM RS OCCs $n_{DMRSOC,0}^{(3)}$ and $n_{DMRSOC,1}^{(3)}$, for antenna ports 0 and 1, respectively, are obtained according to table 1110 of FIG. 11A. In table 1110, the DM RS OCC used for antenna port 0 is always different from the DM RS OCC used) for antenna port 1 for a given CS $n_{CS}^{(3)}$.

In another example, the first DM RS CS $n_{CS,0}^{(3)}$ to be used by antenna port 0 is derived as a function of $n_{OC,2}$, and the second DM RS CS $n_{CS,1}^{(3)}$ to be used by antenna port 1 is derived by $n_{CS,1}^{(3)} = (n_{CS,0}^{(3)} + 7) \mod 12$. The corresponding DM RS OCCs $n_{DMRSOC,0}^{(3)}$ and $n_{DMRSOC,1}^{(3)}$, for antenna ports 0 and 1, respectively, are obtained according to table 1120 of FIG. 11B. In table 1120, the DM RS OCC used for antenna port 0 is always different from the DM RS OCC used for antenna port 1 for a given CS $n_{CS}^{(3)}$. In particular embodiments, the DM RS CS numbers paired with OCC [1 1] is always even, while the DM RS CS numbers paired with OCC [1 −1] is always odd.

Figure 12:
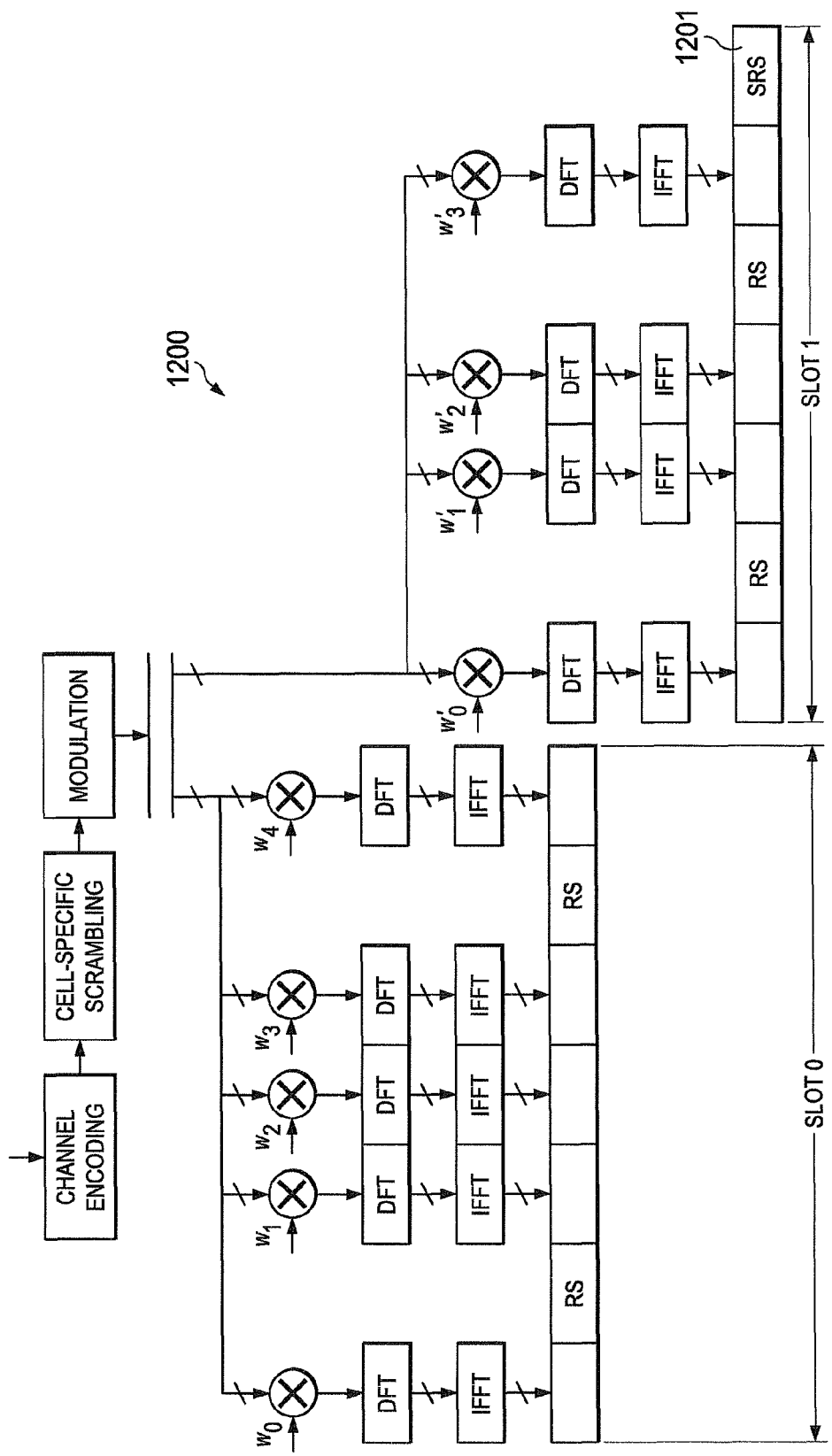
FIG. 12 illustrates a shortened PUCCH format according to another embodiment of this disclosure.

FIG. 12 illustrates a shortened PUCCH format 1200 according to another embodiment of this disclosure.

In some embodiments, locations and/or numbers of DM-RS SC-FDM symbols in the second slot in a PUCCH in which HARQ-ACK is fed back change depending on whether cell-specific SRS is scheduled in the same subframe or not, and an RRC parameter ackNackSRS-SimultaneousTransmission defined in Rel-8/9 LTE.

In one example, when ackNackSRS-SimultaneousTransmission=FALSE, UE drops SRS and transmits HARQ-ACK in PUCCH format X. When ackNack-SRS-SimultaneousTransmission=TRUE, a UE transmits HARQ-ACK using the shortened PUCCH format 1200 shown in FIG. 12, where the shortened PUCCH format 1200 is constructed by shifting the second DM-RS SC-FDM symbol 1201 in the second slot in PUCCH format 1200 to the left by one.

The shortened PUCCH format 1200 constructed according to this embodiment can provide better DMRS measurement and better demodulation performance of HARQ-ACK.

Figure 13:
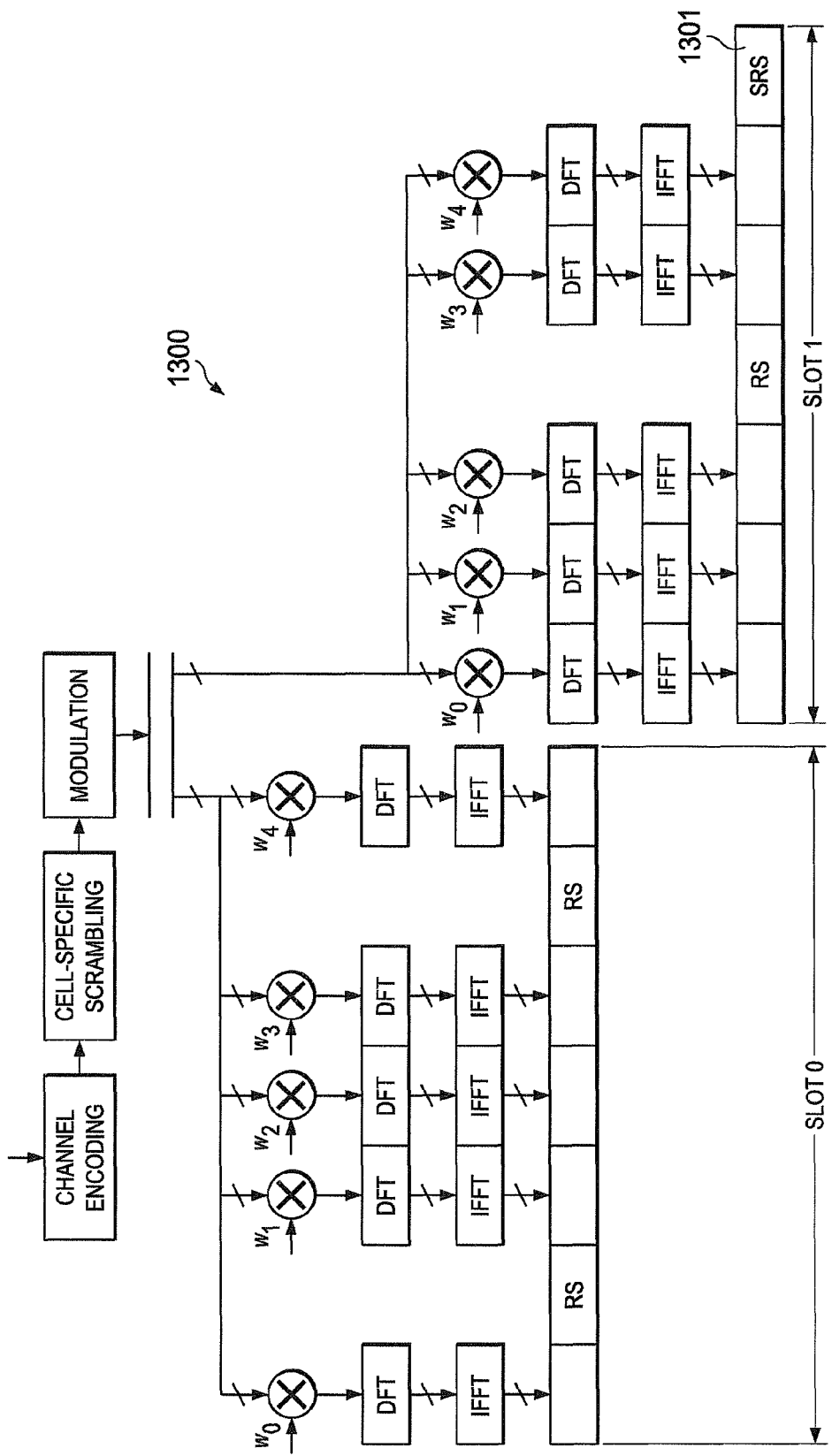
FIG. 13 illustrates a shortened PUCCH format according to a further embodiment of this disclosure.

FIG. 13 illustrates a shortened PUCCH format 1300 according to a further embodiment of this disclosure.

In one example, when ackNackSRS-SimultaneousTransmission=FALSE, a UE drops SRS and transmits HARQ-ACK in PUCCH format X. When ackNack-SRS-SimultaneousTransraission=TRUE, a UE transmits HARQ-ACK using the shortened PUCCH format 1300 shown in FIG. 13, where the shortened PUCCH format 1300 is constructed by removing one DM-RS SC-FDM symbol 1301 in the second slot in PUCCH format 400 and placing the remaining DM RS SC-FDM symbol at the center of the slot as shown in FIG. 13.

The shortened PUCCH format 1300 constructed according to this embodiment keeps the OCC length in slot 1 the same as slot 0.

Figure 14:
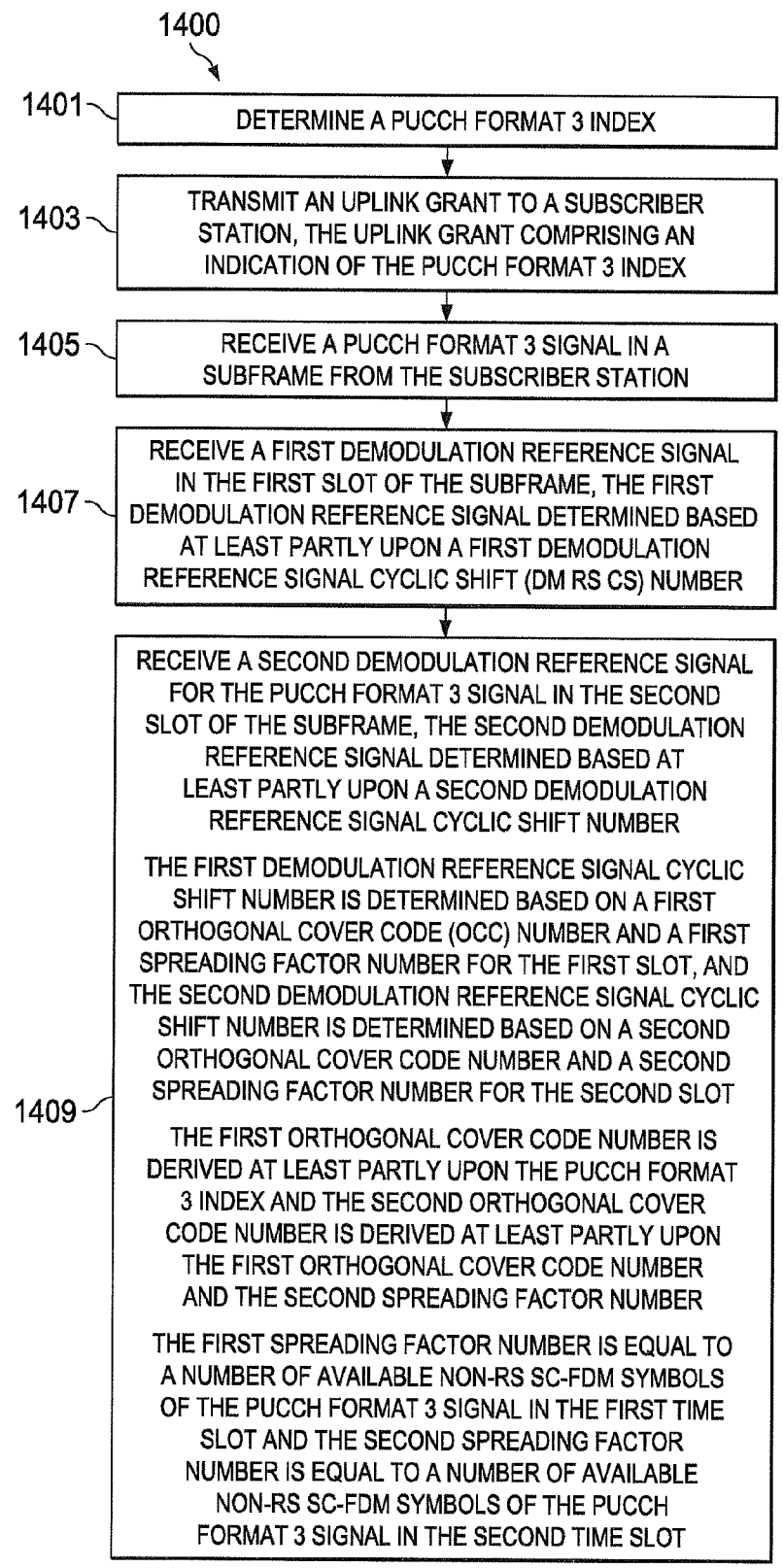
FIG. 14 illustrates a method of operating a base station according to an embodiment of this disclosure.

FIG. 14 illustrates a method 1400 of operating a base station according to an embodiment of this disclosure.

As shown in FIG. 14, method 1400 includes determining a PUCCH format 3 $n_{PUCCH}^{(3)}$ index (block 1401). Method 1400 also includes transmitting an uplink grant to a subscriber station, the uplink grant comprising an indication of the PUCCH format 3 $n_{PUCCH}^{(3)}$ index (block 1403). Method 1400 also includes receiving a PUCCH format 3 signal in a subframe from the subscriber station (block 1405). Method 1400 further includes receiving a first demodulation reference signal in the first slot of the subframe, the first demodulation reference signal determined based at least partly upon a first demodulation reference signal cyclic shift (DM RS CS) number $n_{CS,0}$ (block 1407). Method 1400 also includes receiving a second demodulation reference signal for the PUCCH format 3 signal in the second slot of the subframe, the second demodulation reference signal determined based at least partly upon a second DM RS CS number $n_{CS,1}$ (block 1409).

In method 1400, the first DM RS CS number $n_{CS,0}$ is determined based on a first orthogonal cover code (OCC) number $n_{OC,0}$ and a first spreading factor number $N_{SF,0}$ for the first slot, and the second DM RS CS number $n_{CS,1}$ is determined based on a second OCC number $n_{OC,1}$ and a second spreading factor number $N_{SF,1}$ for the second slot. The first OCC number $n_{OC,0}$ is derived at least partly upon the PUCCH format 3 $n_{PUCCH}^{(3)}$ index and the second OCC number $n_{OC,1}$ is derived at least partly upon the first OCC number $n_{OC,0}$ and the second spreading factor number $N_{SF,1}$. The first spreading factor number $N_{SF,0}$ is equal to a number of available non-RS SC-FDM symbols of the PUCCH format 3 signal in the first time slot and the second spreading factor number $N_{SF,1}$ is equal to a number of available non-RS SC-FDM symbols of the PUCCH format 3 signal in the second time slot.

Figure 15:
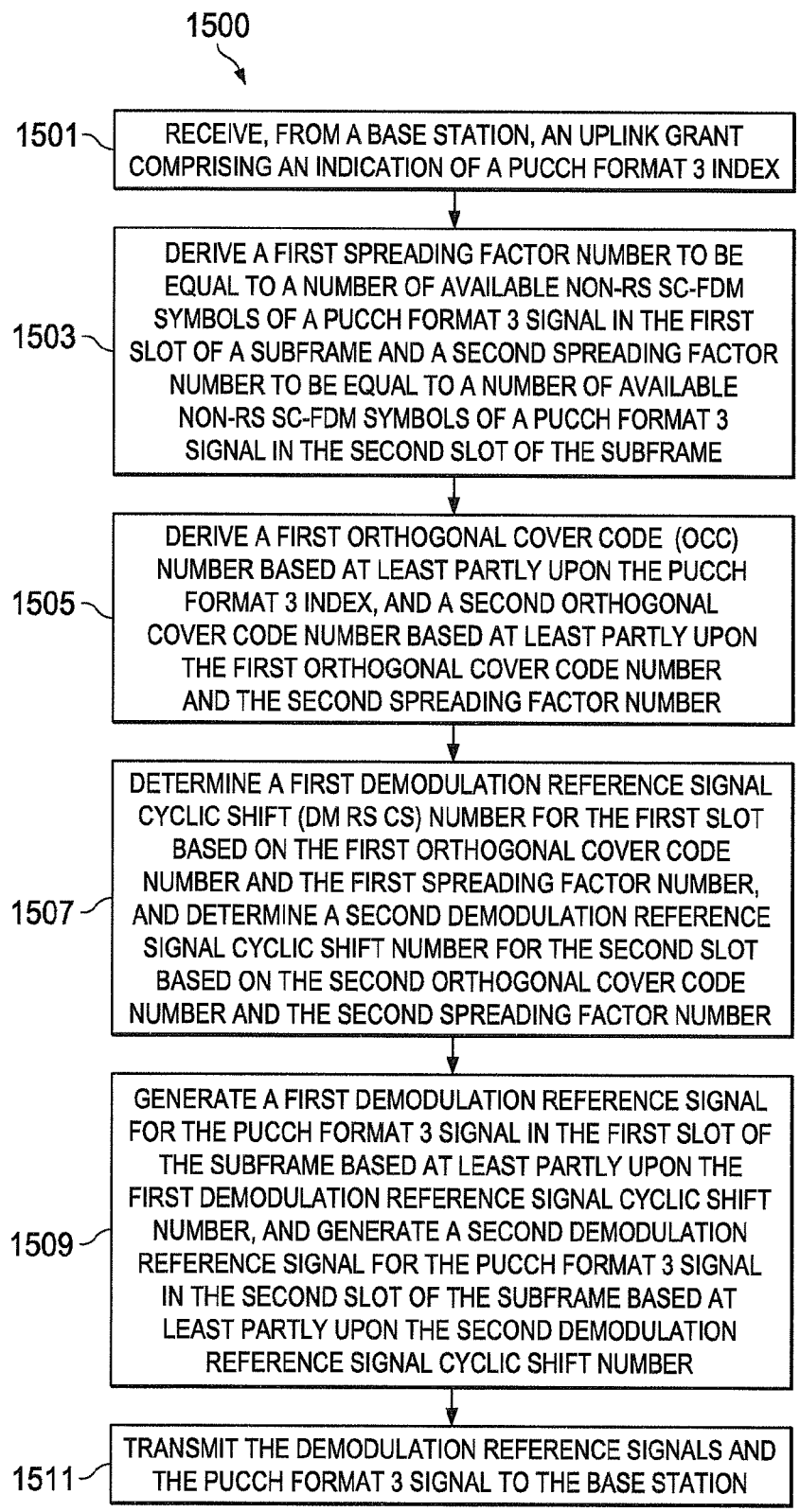
FIG. 15 illustrates a method of operating a subscriber station according to an embodiment of this disclosure.

FIG. 15 illustrates a method 1500 of operating a subscriber station according to an embodiment of this disclosure.

As shown in FIG. 15, method 1500 includes receiving, from a base station, an uplink grant comprising an indication of a PUCCH format 3 $n_{PUCCH}^{(3)}$ index (block 1501). Method 1500 also includes deriving a first spreading factor number $N_{SF,0}$ to be equal to a number of available non-RS SC-FDM symbols of a PUCCH format 3 signal in the first slot of a subframe and a second spreading factor number $N_{SF,1}$ to be equal to a number of available non-RS SC-FDM symbols of a PUCCH format 3 signal in the second slot of the subframe (block 1503). Method 1500 further includes deriving a first orthogonal cover code number (OCC) number $n_{OC,0}$ based at least partly upon the PUCCH format 3 $n_{PUCCH}^{(3)}$ index, and a second OCC number $n_{OC,1}$ based at least partly upon the first OCC number $n_{OC,0}$ and the second spreading factor number $N_{SF,1}$ (block 1505).

Method 1500 also includes determining a first demodulation reference signal cyclic shift (DM RS CS) number $n_{CS,0}$ for the first slot based on the first OCC number $n_{OC,0}$ and the first spreading factor number $N_{SF,0}$, and determining a second DM RS CS number $n_{CS,1}$ for the second slot based on the second OCC number $n_{OC,1}$ and the second spreading factor number $N_{SF,1}$ (block 1507). Method 1500 further includes generating a first demodulation reference signal for the PUCCH format 3 signal in the first slot of the subframe based at least partly upon the first DM RS CS number $n_{CS,0}$, and generating a second demodulation reference signal for the PUCCH format 3 signal in the second slot of the subframe based at least partly upon the second DM RS CS number $n_{CS,1}$ (block 1509). Method 1500 also includes transmitting the demodulation reference signals and the PUCCH format 3 signal to the base station (block 1511).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting using a physical uplink control channel (PUCCH) format 3, the method comprising:
  receiving a control signal and data comprising an indication of a PUCCH format 3 index;
  identifying a spreading factor (SF) based on the PUCCH format 3 index, wherein a number for the SF is 4 or 5;
  determining an orthogonal covering code (OCC) and a cyclic shift (CS) for a reference signal (RS) based on the SF; and
  transmitting one of an acknowledgement (ACK) or non-acknowledgement comprising the RS using PUCCH format 3,
  wherein a relationship between the OCC and the CS is determined such that:
    values of a first four OCC numbers and values of a first three CS numbers are constant regardless of whether the number for the SF is 4 or 5, and
    a value of a fourth CS number varies based on the number for the SF.

2. The method of claim 1, wherein the SF is for a second slot of a subframe, and wherein a number for a SF for a first slot of the subframe has a constant value.

3. The method of claim 1, wherein when the number for the SF is 4, the CS includes four numbers, the value of the fourth CS number is 9, and the first four OCC numbers ($n_{oc}=0$ to $n_{oc}=3$) are used and a fifth OOC number ($n_{oc}=4$) is not used.

4. The method of claim 1, wherein when the number for the SF is 5, the OOC and the CS include five numbers, the value of the fourth CS number is 8, and a value of a fifth CS number is 10.

5. The method of claim 1, wherein:
  when the number for the SF is 5, the value of the fourth CS number is 8, and
  when the number for the SF is 4, the value of the fourth CS number is 9.

6. The method of claim 1, wherein the value of the fourth CS number is determined according to a function:

$$n_{cs}=9-(N_{SF}-4),$$

where $n_{cs}$ is the value of the fourth CS number and $N_{SF}$ is the number for the SF.

7. An apparatus configured to transmit using a physical uplink control channel (PUCCH) format 3, the apparatus comprising:
  receive path circuitry configured to receive a control signal and data comprising an indication of a PUCCH format 3 index; and
  transmit path circuitry configured to:
    identify a spreading factor (SF) based on the PUCCH format 3 index, wherein a number for the SF is 4 or 5;
    determine an orthogonal covering code (OCC) and a cyclic shift (CS) for a reference signal (RS) based on the SF; and
    transmit one of an acknowledgement (ACK) or non-acknowledgement comprising the RS using PUCCH format 3, wherein a relationship between the OCC and the CS is determined such that:
  values of a first four OCC numbers and values of a first three CS numbers are constant regardless of whether the number for the SF is 4 or 5, and
  a value of a fourth CS number varies based on the number for the SF.

8. The apparatus of claim 7, wherein the SF is for a second slot of a subframe, and wherein a number for a SF for a first slot of the subframe has a constant value.

9. The apparatus of claim 7, wherein when the number for the SF is 4, the CS includes four numbers, the value of the fourth CS number is 9, and the first four OCC numbers ($n_{oc}=0$ to $n_{oc}=3$) are used and a fifth OOC number ($n_{oc}=4$) is not used.

10. The apparatus of claim 7, wherein when the number for the SF is 5, the OOC and the CS include five numbers, the value of the fourth CS number is 8, and a value of a fifth CS number is 10.

11. The apparatus of claim 7, wherein:
  when the number for the SF is 5, the value of the fourth CS number is 8, and
  when the number for the SF is 4, the value of the fourth CS number is 9.

12. The apparatus of claim 7, wherein the value of the fourth CS number is determined according to a function:

$$n_{cs}=9-(N_{SF}-4),$$

where $n_{cs}$ is the value of the fourth CS number and $N_{SF}$ is the number for the SF.

13. A method of receiving using a physical uplink control channel (PUCCH) format 3, the method comprising:
  transmitting a control signal and data comprising an indication of a PUCCH format 3 index, wherein the PUCCH format 3 index is configured to indicate a spreading factor (SF) based on the PUCCH format 3 index, wherein a number for the SF is 4 or 5, and wherein the SF is configured to indicate an orthogonal covering code (OCC) and a cyclic shift (CS) for a reference signal (RS); and
  receiving one of an acknowledgement (ACK) or non-acknowledgement comprising the RS using PUCCH format 3,
  wherein a relationship between the OCC and the CS is determined such that:
    values of a first four OCC numbers and values of a first three CS numbers are constant regardless of whether the number for the SF is 4 or 5, and
    a value of a fourth CS number varies based on the number for the SF.

14. The method of claim 13, wherein the SF is for a second slot of a subframe, and wherein a number for a SF for a first slot of the subframe has a constant value.

15. The method of claim 13, wherein when the number for the SF is 4, the CS includes four numbers, the value of the fourth CS number is 9, and the first four OCC numbers ($n_{oc}=0$ to $n_{oc}=3$) are used and a fifth OOC number ($n_{oc}=4$) is not used.

16. The method of claim 13, wherein when the number for the SF is 5, the OOC and the CS include five numbers, the value of the fourth CS number is 8, and a value of a fifth CS number is 10.

17. The method of claim 13, wherein:
  when the number for the SF is 5, the value of the fourth CS number is 8, and
  when the number for the SF is 4, the value of the fourth CS number is 9.

18. The method of claim 13, wherein the value of the fourth CS number is determined according to a function:

$$n_{cs}=9-(N_{SF}-4),$$

where $n_{cs}$ is the value of the fourth CS number and $N_{SF}$ is the number for the SF.

19. An apparatus configured to receive using a physical uplink control channel (PUCCH) format 3, the apparatus comprising:
  transmit path circuitry configured to transmit a control signal and data comprising an indication of a PUCCH format 3 index, wherein the PUCCH format 3 index is configured to indicate a spreading factor (SF) based on the PUCCH format 3 index, wherein a number for the SF is 4 or 5, and wherein the SF is configured to indicate an orthogonal covering code (OCC) and a cyclic shift (CS) for a reference signal (RS); and
  receive path circuitry configured to receive one of an acknowledgement (ACK) or non-acknowledgement comprising the RS using PUCCH format 3,
  wherein a relationship between the OCC and the CS is determined such that:
    values of a first four OCC numbers and values of a first three CS numbers are constant regardless of whether the number for the SF is 4 or 5, and
    a value of a fourth CS number varies based on the number for the SF.

20. The apparatus of claim 19, wherein the SF is for a second slot of a subframe, and wherein a number for a SF for a first slot of the subframe has a constant value.

21. The apparatus of claim 19, wherein when the number for the SF is 4, the CS includes four numbers, the value of the fourth CS number is 9, and the first four OCC numbers ($n_{oc}=0$ to $n_{oc}=3$) are used and a fifth OOC number ($n_{oc}=4$) is not used.

22. The apparatus of claim 19, wherein when the number for the SF is 5, the OOC and the CS include five numbers, the value of the fourth CS number is 8, and a value of a fifth CS number is 10.

23. The apparatus of claim 19, wherein:
  when the number for the SF is 5, the value of the fourth CS number is 8, and
  when the number for the SF is 4, the value of the fourth CS number is 9.

24. The apparatus of claim 19, wherein the value of the fourth CS number is determined according to a function:

$$n_{cs}=9-(N_{SF}-4),$$

where $n_{cs}$ is the value of the fourth CS number and $N_{SF}$ is the number for the SF.

* * * * *